United States Patent
Ganiger et al.

(10) Patent No.: US 11,905,890 B2
(45) Date of Patent: Feb. 20, 2024

(54) DIFFERENTIAL GEARBOX ASSEMBLY FOR A TURBINE ENGINE

(71) Applicants: General Electric Company, Schenectady, NY (US); GE Avio S.r.l., Rivalta di Torino (IT)

(72) Inventors: Ravindra Shankar Ganiger, Bengaluru (IN); Andrea Piazza, Turin (IT); Gontla Nagashiresha, Bengaluru (IN); Bugra H. Ertas, Niskayuna, NY (US); Sanjeev Jha, Bengaluru (IN)

(73) Assignees: GENERAL ELECTRIC COMPANY, Schenectady, NY (US); GE AVIO S.R.L., Rivalta di Torino (IT)

( * ) Notice: Subject to any disclaimer, the term of this patent is extended or adjusted under 35 U.S.C. 154(b) by 0 days.

(21) Appl. No.: 17/806,574

(22) Filed: Jun. 13, 2022

(65) Prior Publication Data
US 2023/0399983 A1 Dec. 14, 2023

(51) Int. Cl.
*F01D 5/10* (2006.01)
*F02C 7/36* (2006.01)
(Continued)

(52) U.S. Cl.
CPC ............... *F02C 7/36* (2013.01); *F01D 15/10* (2013.01); *F02K 3/06* (2013.01); *F05D 2220/768* (2013.01); *F05D 2260/40311* (2013.01)

(58) Field of Classification Search
CPC .......... F02K 3/075; F02K 3/06; F04D 19/007; F04D 19/0224; F02C 3/0697; F02C 7/36;
(Continued)

(56) References Cited

U.S. PATENT DOCUMENTS

| 5,067,932 A | 11/1991 | Edwards |
| 7,481,730 B2 | 1/2009 | Pesiridis et al. |

(Continued)

FOREIGN PATENT DOCUMENTS

| FR | 3127024 A1 | 3/2023 |
| FR | 3127025 A1 | 3/2023 |

(Continued)

OTHER PUBLICATIONS

Sibbach, U.S. Appl. No. 17/170,116, filed Feb. 2, 2021.

*Primary Examiner* — Sabbir Hasan
*Assistant Examiner* — Joshua R Beebe
(74) *Attorney, Agent, or Firm* — Venable LLP; Peter T. Hrubiec; Michele V. Frank

(57) ABSTRACT

A differential gearbox assembly for a turbine engine having a fan shaft and a drive shaft. The differential gearbox assembly includes an epicyclic gear assembly coupling the fan shaft to the drive shaft. The epicyclic gear assembly includes a sun gear, a planet gear constrained by a planet carrier, and a ring gear. The sun gear is coupled to the drive shaft and the planet carrier is coupled to the fan shaft. The sun gear, the planet gear, and the ring gear all rotate about the drive shaft. The differential gearbox assembly includes an electric machine assembly that includes an input coupled to the epicyclic gear assembly. The electric machine assembly provides mechanical power to the fan shaft through the epicyclic gear assembly.

20 Claims, 10 Drawing Sheets

(51) Int. Cl.
*F01D 15/10* (2006.01)
*F02K 3/06* (2006.01)

(58) Field of Classification Search
CPC ............... F01D 15/10; F05D 2260/768; F05D 2260/40311
See application file for complete search history.

(56) References Cited

U.S. PATENT DOCUMENTS

| | | |
|---|---|---|
| 8,500,590 B2 | 8/2013 | Showalter |
| 8,561,383 B2 * | 10/2013 | Suciu ................ F02C 3/113 60/226.1 |
| 9,021,778 B2 | 5/2015 | Kupratis |
| 10,745,118 B2 | 8/2020 | Bourne et al. |
| 2008/0148881 A1 | 6/2008 | Moniz et al. |
| 2013/0269342 A1 | 10/2013 | Oh et al. |
| 2016/0312650 A1 * | 10/2016 | Siebert ................ F04D 29/563 |
| 2019/0214884 A1 * | 7/2019 | Palmer ................ F02K 3/06 |
| 2020/0106336 A1 * | 4/2020 | Klaus ................ F01D 15/10 |
| 2020/0158213 A1 * | 5/2020 | Leque ................ F02K 3/06 |
| 2020/0182158 A1 * | 6/2020 | Kupratis ................ F02C 3/113 |
| 2020/0307818 A1 | 10/2020 | Dubreuil et al. |
| 2020/0403481 A1 * | 12/2020 | Recktenwald ......... H02K 7/006 |
| 2021/0071585 A1 | 3/2021 | Kupratis et al. |
| 2021/0108573 A1 | 4/2021 | Sibbach et al. |
| 2021/0246835 A1 | 8/2021 | Garabello et al. |

FOREIGN PATENT DOCUMENTS

| | | |
|---|---|---|
| FR | 3129436 A1 | 5/2023 |
| FR | 3129690 A1 | 6/2023 |
| FR | 3130747 A1 | 6/2023 |
| FR | 3130875 A1 | 6/2023 |

* cited by examiner

DIFFERENTIAL GEARBOX ASSEMBLY FOR A TURBINE ENGINE

TECHNICAL FIELD

The present disclosure relates generally to differential gearbox assemblies for turbine engines.

BACKGROUND

A turbine engine generally includes a fan and a core section arranged in flow communication with one another. A gearbox assembly is coupled between the fan and the core section.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
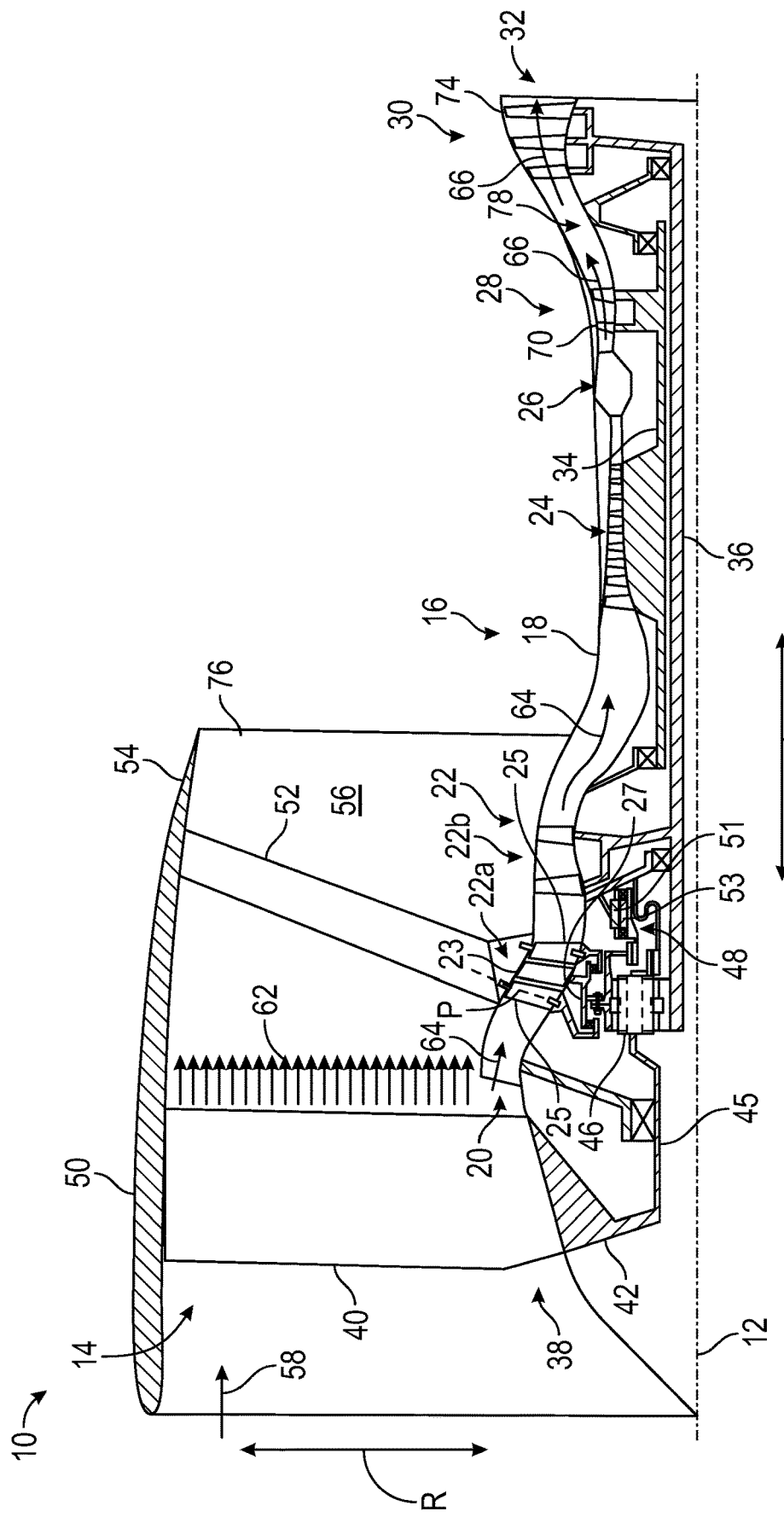
FIG. 1 is a schematic cross-sectional diagram of a turbine engine, taken along a longitudinal centerline of the turbine engine, according to an embodiment of the present disclosure.

Additional features, advantages, and embodiments of the present disclosure are set forth or apparent from a consideration of the following detailed description, drawings, and claims. Moreover, both the foregoing summary of the present disclosure and the following detailed description are exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" refers to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, "mechanical power," or "mechanically powered" refers to an amount of energy transferred or converted per unit time. Mechanical power is the product of a force on an object and the velocity of the object, or a product of a torque on a shaft and the angular velocity of the shaft.

As used herein, "electric power" refers to the rate per unit time at which electrical energy is transferred by an electric circuit.

The compressor section, the turbine section, and the fan may require different speeds and mechanical power to achieve greater efficiencies (e.g., improved efficiency in the conversion of kinetic energy in the fluid stream to mechanical energy in the turbine shaft). The embodiments of the present disclosure provide for a differential gear system in which the fan shaft, the high pressure (HP) shaft, and the booster operate at different speeds using a carrier gear system. The present disclosure allows the individual modules (e.g., the fan shaft, the HP shaft, and the booster) to rotate at different speeds and allows the lower pressure (LP) system to rotate at higher speeds while maintaining the speed of the fan and the booster at desired levels. The high speed LP shaft of the LP system provides torque or mechanical power to a sun gear of the differential gear system that rotates at the high speed of the LP shaft. A carrier gear of the differential gear system is driven by the sun gear and, in turn, drives the fan shaft at a different speed than the LP shaft. The fan shaft and the LP shaft may rotate in the same direction. The carrier gear is connected to a ring gear of the differential gear system. The ring gear is connected to the booster and is mounted to a variable stator vane (VSV) assembly of the booster. The VSV assembly controls the flow rate to the compressor.

An electric motor is also connected to the ring gear. The electric motor controls a torque distribution between the booster and the fan. For example, during a takeoff flight mode of the turbine engine, the torque draw from the booster may be reduced and the electric motor may add a corresponding torque to the ring gear to drive the ring gear. An electric generator extracts mechanical power through the differential gear system. For example, during a cruise flight mode, a taxi flight mode, or an approach flight, the electric generator may extract mechanical power from the ring gear and generate electric power. Embodiments of the present disclosure also provide for a hybrid-electric architecture in which the electric motor drives the fan without core power. In some embodiments, the electric motor and the electric generator may be a dual electric motor/generator.

The embodiments provided herein allow for the mechanical power to be varied at the booster by the VSV assembly. In order to keep speed constant, the electric motor changes the torque to the ring gear. Electric power generation can occur when either the booster or the fan reduces mechanical power, but the LP turbine keeps the same output (e.g., the LP turbine provides the same mechanical power or torque through the sun gear). In some embodiments, electric power input from the electric motor into the system may generate more horsepower (e.g., mechanical power) for the fan through a torque increase at the booster stage. In such embodiments, the VSV assembly is actuated to provide for the torque increase such that the speeds do not change.

The present disclosure allows higher rotational speeds of the LP turbine, the fan, and the high-pressure turbine. Embodiments of the present disclosure may differentiate the speeds at transient conditions. The equal distribution of torque on the rotating components (e.g., the fan, the LP turbine, and the booster) eliminates or reduces bearing dynamic issues and shaft dynamic issues compared to turbine engines without the benefit of the present disclosure.

Referring now to the drawings, FIG. 1 is a schematic cross-sectional diagram of a turbine engine 10, taken along a longitudinal centerline 12 of the turbine engine 10, according to an embodiment of the present disclosure. As shown in FIG. 1, the turbine engine 10 defines an axial direction A (extending parallel to a longitudinal centerline 12 provided for reference) and a radial direction R that is normal to the axial direction A. In general, the turbine engine 10 includes a fan section 14 and a core turbine engine 16 disposed downstream from the fan section 14.

The core turbine engine 16 depicted generally includes an outer casing 18 that is substantially tubular and defines an annular inlet 20. As schematically shown in FIG. 1, the outer casing 18 encases, in serial flow relationship, a compressor section including a low pressure (LP) compressor or a booster 22 followed downstream by a high pressure (HP) compressor 24, a combustion section 26, a turbine section including a high pressure (HP) turbine 28 followed downstream by a low pressure (LP) turbine 30, and a jet exhaust nozzle section 32. A high pressure (HP) shaft 34 drivingly connects the HP turbine 28 to the HP compressor 24 to rotate the HP turbine 28 and the HP compressor in unison. The compressor section, the combustion section 26, the turbine section, and the jet exhaust nozzle section 32 together define a core air flowpath.

For the embodiment depicted in FIG. 1, the booster 22 includes a plurality of stages. For example, the booster 22 includes a first booster stage 22a, also referred to as a fan booster, and a second booster stage 22b, also referred to as an LP turbine booster. A low pressure (LP) shaft 36, or drive shaft, drivingly connects the LP turbine 30 to the second booster stage 22b to rotate the LP turbine 30 and the second booster stage 22b in unison. The first booster stage 22a includes a plurality of blades 23 and a plurality of variable stator vanes (VS V) 25. The VSVs 25 include a first stage of VSVs 25 positioned upstream of the plurality of blades 23. The VSVs may also include a second stage of VSVs 25 positioned downstream of the plurality of blades 23. Each VSV 25 is rotatable about a pitch axis P by virtue of the VSVs 25 being operatively coupled to an actuation member configured to collectively vary the pitch of the VSVs in unison. The plurality of blades 23 are rotatable about the longitudinal centerline 12 via a booster shaft 27 that is mechanically powered by the LP shaft 36 across a differential gearbox assembly 46, as detailed further below. The differential gearbox assembly 46 includes an epicyclic gear assembly in which a sun gear, a planet carrier, and a ring gear all rotate with respect to the longitudinal centerline 12, as detailed further below. The differential gearbox assembly 46 includes a plurality of gears for adjusting the rotational speed of the booster shaft 27 and, thus, the first booster stage 22a relative to the LP shaft 36 to a more efficient booster speed. In some examples, the booster 22 includes a single booster stage connected to the differential gearbox assembly 46. In some examples, the booster 22 includes a plurality of booster stages connected to the differential gearbox assembly 46.

The fan section 14 includes a fan 38 having a plurality of fan blades 40 coupled to a disk 42 in a spaced apart manner. As depicted in FIG. 1, the fan blades 40 extend outwardly from the disk 42 generally along the radial direction R. The fan blades 40 and the disk 42 are together rotatable about the longitudinal centerline 12 via a fan shaft 45 that is mechanically powered by the drive shaft (e.g., the LP shaft 36) across the differential gearbox assembly 46, as detailed further below. While the drive shaft is depicted as the LP shaft 36, the drive shaft may be the HP shaft 36 in some examples. The plurality of gears of the differential gearbox assembly 46 adjusts the rotational speed of the fan shaft 45 and, thus, the fan 38 relative to the LP shaft 36 to a more efficient rotational fan speed.

The differential gearbox assembly 46 includes an electric machine assembly 48 operable with the differential gearbox assembly 46, as detailed further below. The electric machine assembly 48 includes a stator 51 and a rotor 53. The stator 51 and the rotor 53 are annular about the LP shaft 36 (e.g., about the longitudinal centerline 12) and the electric machine assembly 48 is an annular drive system. For example, the stator 51 and the rotor 53 are annular rings and are concentric with respect to each other. The rotor 53 is disposed radially within the stator 51. In some examples, the stator 51 is disposed radially within the rotor 53.

The stator 51 is fixedly mounted to, for example, the outer casing 18 via one or more linkages. The rotor 53 is coupled to a gear (e.g., a ring gear) of the differential gearbox assembly 46, for example, by a geared coupling, a spline coupling, a bolt, or the like. In this way, the rotor 53 is rotatable by the gear of the differential gearbox assembly 46, and the gear of the differential gearbox assembly 46 is rotatable by the rotor 53, allowing mechanical power or torque to be transferred between the electric machine assembly 48 and the gear of the differential gearbox assembly 46, as detailed further below. The rotor 53 is rotatable by the gear of the differential gearbox 46 at the same speed as the gear. Generally, the electric machine assembly 48, together with the differential gearbox assembly 46, allows the turbine engine 10 to operate with improved efficiency, as the operating speeds of the LP shaft 36, the first booster stage 22a, and the fan 38 may be independently changed to improve stability and efficiency for a particular operating mode of the turbine engine 10. More specifically, the operating speed of the first booster stage 22a may be controlled to improve the efficiency of the first booster stage 22a across transient speeds of the LP shaft 36. For example, the electric machine assembly 48 facilitates torque transfer between the first booster stage 22a and the fan 38, as detailed further below. In this way, the electric machine assembly 48 and the differential gearbox assembly 46 allow for optimally controlling the torque to the first booster stage 22a and the fan 38 at various mission cycles (e.g., takeoff, climb, cruise, descent, taxi, and approach).

Referring still to the exemplary embodiment of FIG. 1, the fan section 14 includes an annular fan casing or a nacelle 50 that circumferentially surrounds the fan 38 and/or at least a portion of the core turbine engine 16. The nacelle 50 is supported relative to the core turbine engine 16 by a plurality of circumferentially spaced outlet guide vanes 52. Moreover, a downstream section 54 of the nacelle 50 extends over an outer portion of the core turbine engine 16 to define a bypass airflow passage 56 therebetween.

During operation of the turbine engine 10, a volume of air 58 enters the turbine engine 10 through an inlet of the nacelle 50 and/or the fan section 14. As the volume of air 58 passes across the fan blades 40, a first portion of the air 58 as indicated by arrow 62 is directed or routed into the bypass airflow passage 56, and a second portion of the air 58 as indicated by arrow 64 is directed or is routed into the upstream section of the core air flowpath, or, more specifically, into the annular inlet 20 of the booster 22. The ratio between the first portion of air 62 and the second portion of air 64 is commonly known as a bypass ratio. The pressure of the second portion of air 64 is then increased as the second portion of air 64 is routed through the HP compressor 24 and into the combustion section 26, where the highly pressurized air is mixed with fuel and burned to provide combustion gases 66.

The combustion gases 66 are routed into the HP turbine 28 and expanded through the HP turbine 28 where a portion of thermal and/or of kinetic energy from the combustion gases 66 is extracted via sequential stages of HP turbine stator vanes that are coupled to the outer casing 18 and HP turbine rotor blades 70 that are coupled to the HP shaft 34, thus causing the HP shaft 34 to rotate, thereby supporting operation of the HP compressor 24. The combustion gases 66 are then routed into the LP turbine 30 and expanded through the LP turbine 30. Here, a second portion of thermal and kinetic energy is extracted from the combustion gases 66 via sequential stages of the LP turbine stator vanes that are coupled to the outer casing 18 and the LP turbine rotor blades 74 that are coupled to the LP shaft 36, thus, causing the LP shaft 36 to rotate. This thereby supports operation of the booster 22 and rotation of the fan 38 via the differential gearbox assembly 46, as detailed further below.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the core turbine engine 16.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, it should be appreciated that, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, and/or turboshaft engines.

Figure 2:
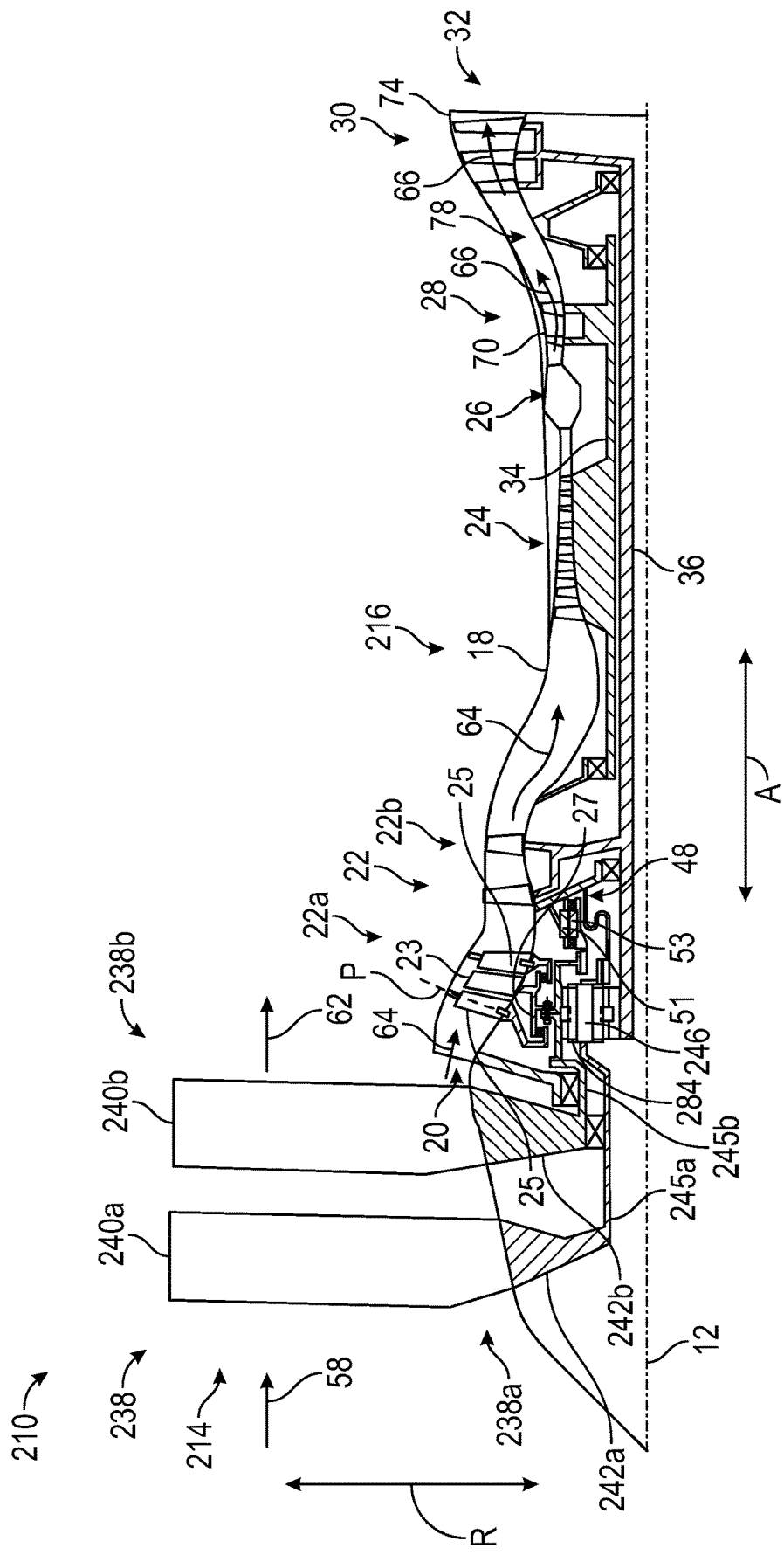
FIG. 2 is a schematic cross-sectional diagram of a turbine engine, taken along a longitudinal centerline of the turbine engine, according to an embodiment of the present disclosure.

FIG. 2 is a schematic cross-sectional diagram of a turbine engine 210, taken along a longitudinal centerline 12 of the turbine engine 210, according to an embodiment of the present disclosure. The embodiment of FIG. 2 includes many of the same or similar components and functionality as the embodiment shown in FIG. 1. The same reference numeral is used for the same or similar components in these embodiments, and a detailed description of these components and functionality is omitted here. Some reference numerals have been removed for clarity.

In the embodiment of FIG. 2, the turbine engine 210 includes a propfan engine, also referred to as an open-fan engine or as an unducted fan engine. In this way, the turbine engine 210 of FIG. 2 does not include a nacelle 50 covering the fan 38. Open-fan engines, such as the turbine engine 210, provide for ultra-high bypass ratios, and thus provide for improved propulsive efficiency as compared to ducted fan engines (e.g., turbofan engines or turboprop engines). A core turbine engine 216 of the turbine engine 210 may be substantially the same as the core turbine engine 16 of the turbine engine 10. A fan section 214 of the turbine engine 210 includes a plurality of fans 238 including a first fan 238a and a second fan 238b.

The first fan 238a is substantially to the fan 38 of FIG. 1 and includes a plurality of first fan blades 240a coupled to a first disk 242a in a spaced apart manner. The second fan 238b includes a plurality of second fan blades 240b coupled to a second disk 242b in a space apart manner. The second fan 238b is located downstream of the first fan 238a. The first fan blades 240a and the first disk 242a are together rotatable about the longitudinal centerline 12 via a first fan shaft 245a that is mechanically powered by the LP shaft 36 across a differential gearbox assembly 246, similar to the embodiment of FIG. 1. The second fan blades 240b and the second disk 242b are together rotatable about the longitudinal centerline 12 via a second fan shaft 245b that is mechanically powered by the LP shaft 36 across the differential gearbox assembly 246, as detailed further below. The second fan shaft 245b is counter-rotating to the first fan shaft 245a.

The plurality of gears of the differential gearbox assembly 46 adjusts the rotational speed of the first fan shaft 245a and, thus, the first fan 238a relative to the LP shaft 36 to a more efficient rotational fan speed of the first fan 238a. Similarly, the plurality of gears of the differential gearbox assembly 246 adjusts the rotational speed and adjusts the direction of rotation of the second fan shaft 245b and, thus, the second fan 238b relative to the LP shaft 36 to a more efficient rotational fan speed of the second fan 238b. In this way, the first fan 238a and the second fan 238b are counter-rotating, which provides a higher propulsive efficiency as compared to non-counter-rotating fans. In the embodiment of FIG. 2, the second fan shaft 245*b*, the first booster stage 22*a*, and the electric machine assembly 48 are connected to a ring gear 284 of the differential gearbox assembly 246, as detailed further below.

Figure 3:
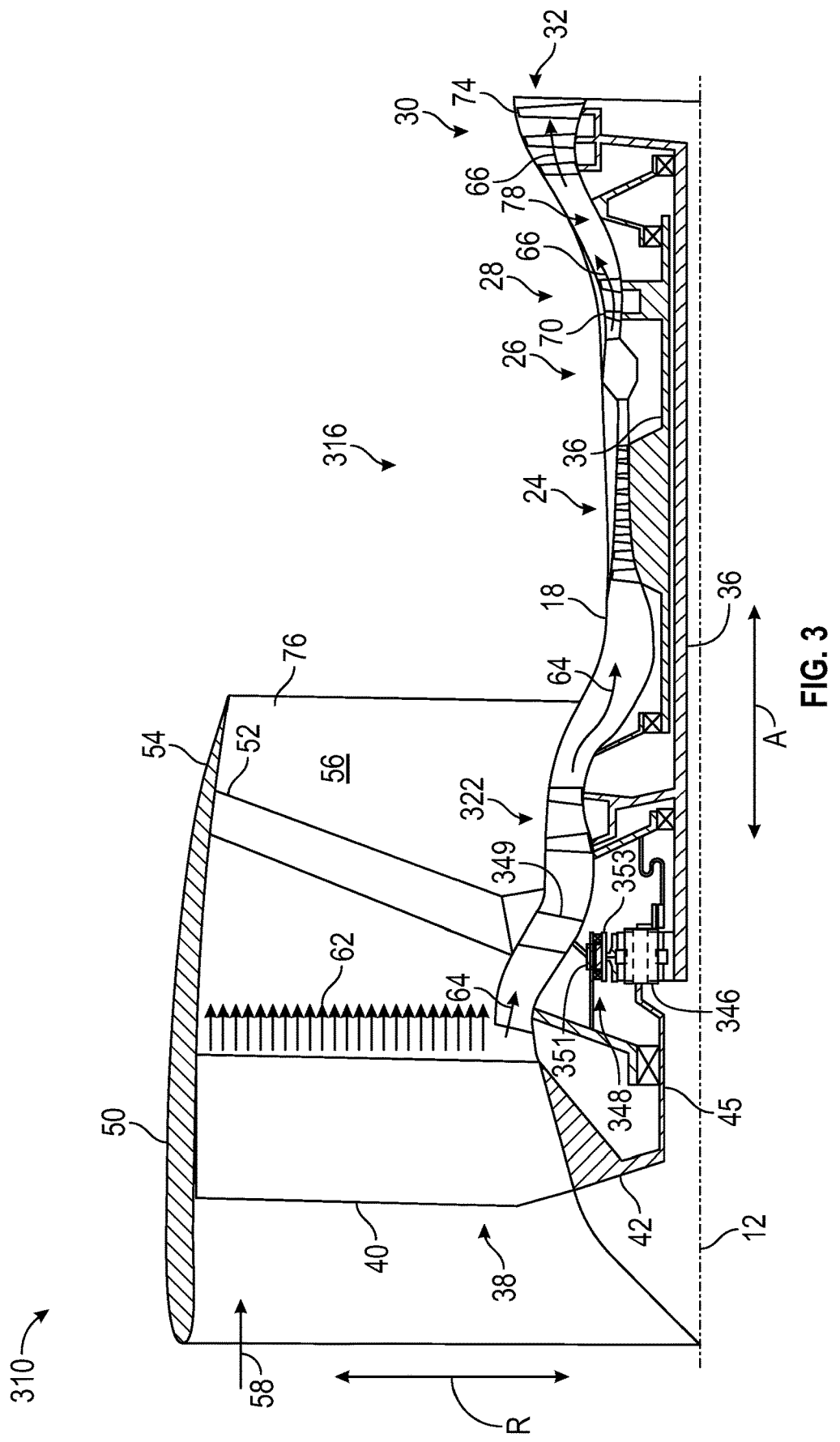
FIG. 3 is a schematic cross-sectional diagram of a turbine engine, taken along a longitudinal centerline of the turbine engine, according to an embodiment of the present disclosure.

FIG. 3 is a schematic cross-sectional diagram of a turbine engine 310, taken along a longitudinal centerline 12 of the turbine engine 310, according to an embodiment of the present disclosure. The embodiment of FIG. 3 includes many of the same or similar components and functionality as the embodiment shown in FIG. 1. The same reference numeral is used for the same or similar components in these two embodiments, and a detailed description of these components and functionality is omitted here. Some reference numerals have been removed for clarity.

In the embodiment of FIG. 3, the turbine engine 310 includes substantially the same turbine engine 10 as the embodiment of FIG. 1. For example, the turbine engine 310 includes a core turbine engine 316 and a differential gearbox assembly 346 that include similar components of the core turbine engine 16 and the differential gearbox assembly 46, detailed above. The turbine engine 310, however, does not include a first booster stage connected to the differential gearbox assembly 346. Rather, the turbine engine 310 includes a stationary structure 349 disposed upstream of a booster 322. The stationary structure 349 connects an electric machine assembly 348 and/or connects the differential gearbox assembly 346 to the outer casing 18. Thus, in the embodiment FIG. 3, the electric machine assembly 348 allows the turbine engine 310 to operate with improved efficiency, as the operating speeds of the LP shaft 36 and the fan 38 may be independently changed to improve stability and efficiency. More specifically, the operating speed of the fan 38 may be controlled to improve the efficiency of the fan 38 across transient speeds of the LP shaft 36. For example, the electric machine assembly 348 facilitates torque transfer between the LP shaft 36 and the fan 38, as detailed further below. In this way, the electric machine assembly 348 and the differential gearbox assembly 46 allow for optimally controlling the torque to the fan 38 at various mission cycles (e.g., takeoff, climb, cruise, descent, taxi, and approach).

The electric machine assembly 348 includes a stator 351 and a rotor 353. The electric machine assembly 348 is similar to the electric machine assembly 48 of FIG. 1 and is annular about the LP shaft 36. The stator 351 is fixedly mounted to, for example, the outer casing 18 via one or more linkages. The rotor 353 is coupled to a gear of the differential gearbox assembly 346, as detailed above. In this way, the rotor 353 is rotatable by the gear of the differential gearbox assembly 346, and the gear of the differential gearbox assembly 346 is rotatable by the rotor 353, allowing mechanical power or torque to be transferred between the electric machine assembly 348 and the gear of the differential gearbox assembly 346, as detailed further below.

Figure 4:
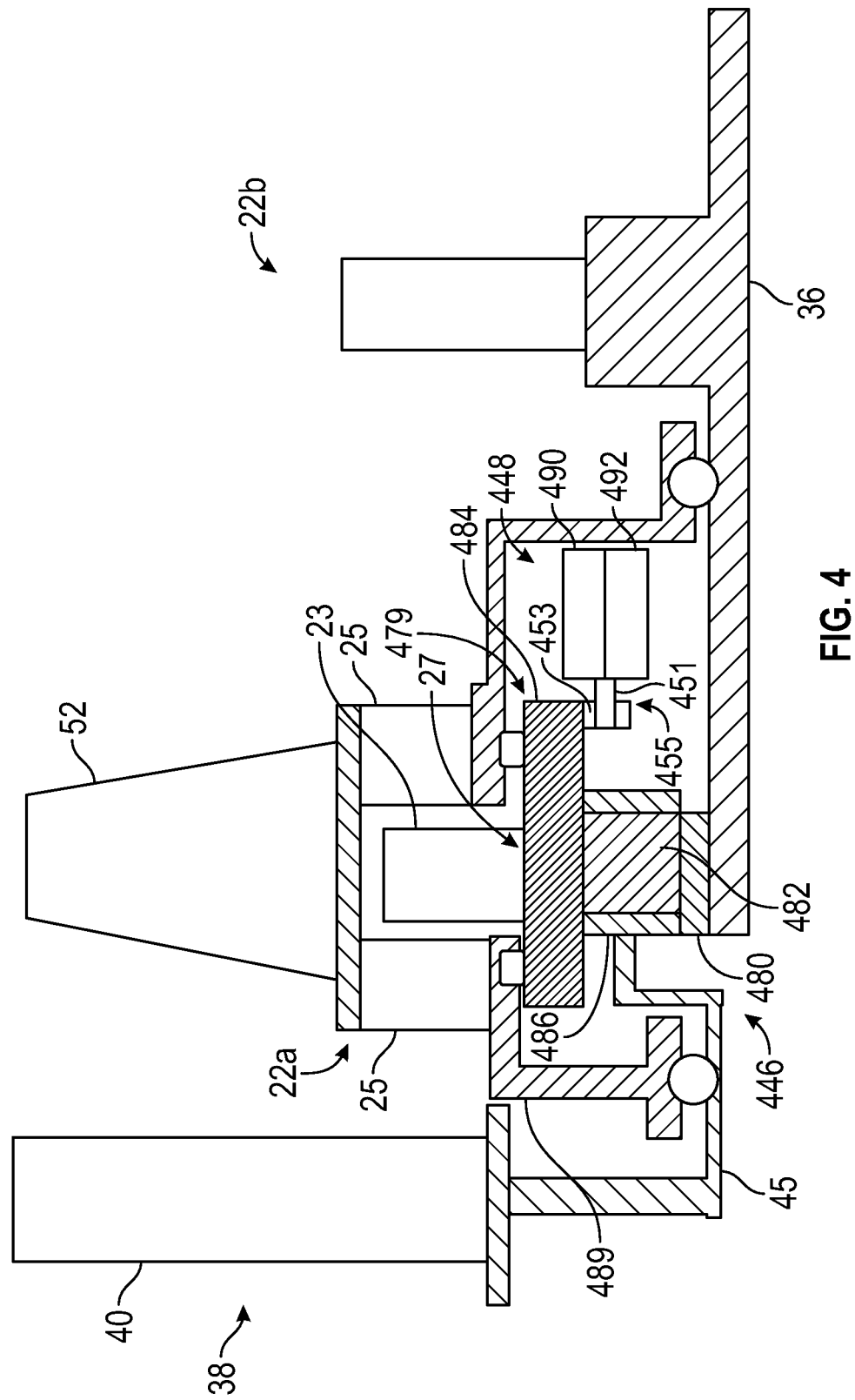
FIG. 4 is a schematic cross-sectional side view of a differential gearbox assembly for a turbine engine, taken along a longitudinal centerline o the turbine engine, according to an embodiment of the present disclosure.

FIG. 4 is a schematic cross-sectional side view of a differential gearbox assembly 446 for a turbine engine, taken along a longitudinal centerline of the turbine engine, according to an embodiment of the present disclosure. The differential gearbox assembly 446 may be employed in the turbine engine 10 of FIG. 1 or in the turbine engine 210 of FIG. 2. That is, the differential gearbox assembly 446 may couple the LP shaft 36 to the fan 38 and to the first booster stage 22*a* (FIG. 1) or may couple the LP shaft 36 to the first fan 238*a*, to the second fan 238*b*, and to the first booster stage 22*a* (FIG. 2). The differential gearbox assembly 446 includes an epicyclic gear assembly 479 including a sun gear 480, a plurality of planet gears 482 (only one of which is visible in FIG. 4), and a ring gear 484. For clarity, only a portion of the gears is shown (e.g., the sun gear 480 includes a portion below the LP shaft 36 and the ring gear 484 is annular and encircles the LP shaft 36). A planet carrier 486 constrains the plurality of planet gears 482 to rotate around the sun gear 480 in synchronicity while enabling each planet gear of the plurality of planet gears 482 to rotate about its own axis. For clarity, only a portion of the gears is shown. A housing 489 may enclose the differential gearbox assembly 446. The housing 489 includes a stationary component such that the housing 489 does not rotate. The planet carrier 486 is coupled to the fan 38 (FIG. 1) or to the first fan 238*a* (FIG. 2) and rotates with the plurality of planet gears 482 in order to drive rotation of the fan 38 (FIG. 1) or the first fan 238*a* (FIG. 2) about the longitudinal centerline 12 (FIGS. 1 and 2). Radially outwardly of the plurality of planet gears 482, and intermeshing therewith, is the ring gear 484. In the differential gearbox assembly 446, the ring gear 484, the planet carrier 486, and the plurality of planet gears 482 each rotate about the longitudinal centerline 12 (FIGS. 1 and 2).

The LP shaft 36 is connected to the sun gear 480, the fan shaft 45 is connected to the planet carrier 486, and the booster shaft 27 is connected to the ring gear 484. In this way, the LP shaft 36 and the sun gear 480 are rotatable together, the fan shaft 45 and the planet carrier 486 are rotatable together, and the booster shaft 27 and the ring gear 484 are rotatable together. In some examples, the second fan shaft 245*b* (FIG. 2) is also connected to the ring gear 484 such that the second fan shaft 245*b* and the ring gear 484 are also rotatable together.

The differential gearbox assembly 446 includes an electric machine assembly 448. The electric machine assembly 448 includes an electric motor 490 and an electric generator 492. In some examples, the electric motor 490 and the electric generator 492 may together form a single component of the electric machine assembly 448 such that the electric machine assembly 448 is a dual electric motor/electric generator (as shown in FIG. 4A). In some examples, the electric motor 490 and the electric generator 492 may form separate components of the electric machine assembly 448, as detailed further below. The electric machine assembly 448 of FIG. 4 is an axial electric machine, also referred to as a compact drive system, such that the stator and the rotor of the electric machine assembly 448 are located inside a housing and are not visible in the view of FIG. 4. In this way, the electric machine assembly 448 is located at a discrete location within turbine engine 410 and the electric machine assembly 448 is not annular about the LP shaft 36. The electric machine assembly 448 includes an input 455. The input 455 is coupled to a rotating component of the differential gearbox assembly 446, such as to the ring gear 484. In this way, the ring gear 484 is coupled to both the booster 22 (e.g., the first booster stage 22*a*) and the electric machine assembly 448 (and the second fan 238*b* of FIG. 2). The input 455 includes a shaft 451 and a gear 453. The shaft 451 is coupled to the rotor internally to the electric machine assembly 448 such that rotation of the shaft 451 rotates the rotor and the rotor rotates with respect to the stator (also located internally to the electric machine assembly 448). The shaft 451 is coupled to the gear 453 and the gear 453 intermeshes with the ring gear 484. In this way, the input 455 is rotatable by the ring gear 484, and the ring gear 484 is rotatable by the input 455, allowing mechanical power or torque to be transferred between the electric machine assembly 448 and the ring gear 484. The gear 453 includes a smaller diameter than the ring gear 484. Accordingly, the shaft 451 rotates faster than the ring gear 484.

The electric machine assembly 448 may have any suitable configuration. For example, the electric machine assembly 448 may be configured in any suitable manner for converting mechanical power to electrical power, or electrical power to mechanical power. For example, the electric machine assembly 448 may be configured as an asynchronous or an induction electric machine operable to generate or to utilize alternating current (AC) electric power. Alternatively, the electric machine assembly 448 may be configured as a synchronous electric machine operable to generate or to utilize AC electric power or direct current (DC) electric power. In such a manner, the stator, the rotor, or both, may generally include one or more of a plurality of coils or winding arranged in any suitable number of phases, one or more permanent magnets, one or more electromagnets, etc.

The embodiments detailed herein may use an annular drive system electric machine (e.g., the electric machine assembly 48 of FIG. 1) or a compact drive system (e.g., the electric machine assembly 448 of FIG. 4). Selection of the electric machine assembly (e.g., annular drive system or compact drive system) may be based on a balance of size, weight, electric power requirements, etc. For example, annular drive systems includes a rotor and a stator that have larger diameters than the rotors and stators of compact drive systems. In this way, a single annular drive system generates or outputs more electric power than a compact drive system. A compact drive system, however, requires less space within a particular turbine engine than the annular drive system and thus provides more weight savings compared to an annular drive system. In some examples, a plurality of compact drive systems may be used and may be coupled to the ring gear 484 at various circumferential locations to match the electric power capabilities of a single annular drive system.

In certain exemplary embodiments, the electric machine assembly 448 may be operated as the electric generator 492, such that mechanical power may be transferred from the ring gear 484 to the rotor via the input 455 of the electric machine assembly 448, with the electric machine assembly 448 converting such mechanical power to electrical power. The electric machine assembly 448 may further store such electric power (e.g., to charge a battery pack, or for any other suitable purpose). Further, in other exemplary aspects, however, the electric machine assembly 448 may be operated as the electric motor 490, converting electrical power to mechanical power, rotating the rotor via the input 455 of the electric machine assembly 448 in a circumferential direction and driving the ring gear 484 via the input 455. In such a manner, the electric machine assembly 448 rotates the first booster stage 22*a*, the fan 38, or both. The electric machine assembly 448 may receive electrical power from the electric generator 492 during such operations. In some examples, the electric machine assembly 448 drives the ring gear 484 to rotate the first booster stage 22*a* and the second fan 238*b* (FIG. 2).

In operation, the LP shaft 36 rotates at a high speed and provides torque or mechanical power to the sun gear 480 at the high speed. The sun gear 480 drives the planet carrier 486 (e.g., through the plurality of planet gears 482), and the planet carrier 486 drives the fan 38 at a different speed than the LP shaft 36. The planet carrier 486 is connected to the ring gear 484, and the ring gear 484 is connected to the first booster stage 22*a* and to the electric machine assembly 448, as detailed above. In some examples, the ring gear 484 is also drives the second fan 238*b* (FIG. 2). Mechanical power of the LP shaft 36 is provided as an input to the differential gearbox assembly 446 via the sun gear 480. The mechanical power of the LP shaft 36 is provided to the fan 38 via the planet carrier 486. The mechanical power of LP shaft 36 is also provided to the first booster stage 22*a* and to the electric machine assembly 448 (and to the second fan 238*b* of FIG. 2) via the ring gear 484. In this way, torque is transferred from the LP turbine 30 (FIGS. 1 to 3) to the sun gear 480 through the LP shaft 36. The torque is transferred from the sun gear 480 through the planet carrier 486 to the fan 38 via the fan shaft 45. The torque is also transferred from the sun gear 480 through the ring gear 484 to the booster 22 (e.g., the first booster stage 22*a*) via the booster shaft 27. The mechanical power and the torque provided by the ring gear 484 is split between the first booster stage 22*a* and the electric machine assembly 448 (and the second fan 238*b* of FIG. 2).

The mechanical power or the torque split between the first booster stage 22*a* and the electric machine assembly 448 is varied at the first booster stage 22*a* by modulating the VSVs 25. For example, the VSVs 25 may be actuated to rotate about the pitch axis P to provide an incidence angle of the VSVs 25 to control an angle of the air 64 flow to the plurality of blades 23 of the first booster stage 22*a*. In this way, the mechanical power draw or the torque draw from the first booster stage 22*a* is a function of the incidence angle of the VSVs 25. For example, an optimum incidence angle of the VSVs 25 may provide a maximum mechanical power or a maximum torque draw from the first booster stage 22*a* for a given speed of the first booster stage 22*a*.

In a first operating mode, the electric motor 490 of the electric machine assembly 448 drives the ring gear 484 to control a torque distribution for the first booster stage 22*a* and the fan 38 (e.g., the fan shaft 45). The electric motor 490 may provide electric power input through the ring gear 484 to generate more horsepower (e.g., mechanical power) at the fan 38 through a torque increase at the first booster stage 22*a*. For example, the electric motor 490 changes the torque of the ring gear 484, while the VSVs 25 are actuated to control the incidence angle to ensure the speed of the ring gear 484 remains constant.

In a second operating mode, the electric generator 492 of the electric machine assembly 448 generates electric power. For example, the first booster stage 22*a* may reduce mechanical power, while the mechanical power provided by the LP shaft 36 remains constant. The VSVs 25 are actuated to change the incidence angle in order to reduce the mechanical power of the first booster stage 22*a*. The mechanical power of the LP shaft 36 that is no longer going to the first booster stage 22*a* (e.g., due to the reduced mechanical power of the first booster stage 22*a*) is provided to the electric generator 492 through the ring gear 484. In this way, the electric generator 492 of the electric machine assembly 448 generates and stores electric power, as detailed above.

In some examples, the first operating mode is a first flight mode and the second operating mode is a second flight mode. The first flight mode and the second flight mode include a mission cycle of the turbine engine 10, 210, 310. The mission cycle may include, for example, a takeoff flight mode, a climb flight mode, a cruise flight mode, a step change flight mode, a descent flight mode, a landing flight mode, a taxi flight mode, or the like. The second flight mode may be different than the first flight mode. In some examples, the first flight mode, and, thus, the first operating mode, includes the takeoff flight mode and/or the descent flight mode. In this way, the electric motor 490 of the electric machine assembly 448 drives the ring gear 484, as detailed above, during the takeoff flight mode and/or during the descent flight mode. In some examples, the second flight mode, and, thus, the second operating mode, includes the cruise flight mode and/or the taxi flight mode. In this way, the electric generator 492 of the electric machine assembly 448 generates electric power, as detailed above, during the cruise flight mode and/or during the taxi flight mode.

Figure 5:
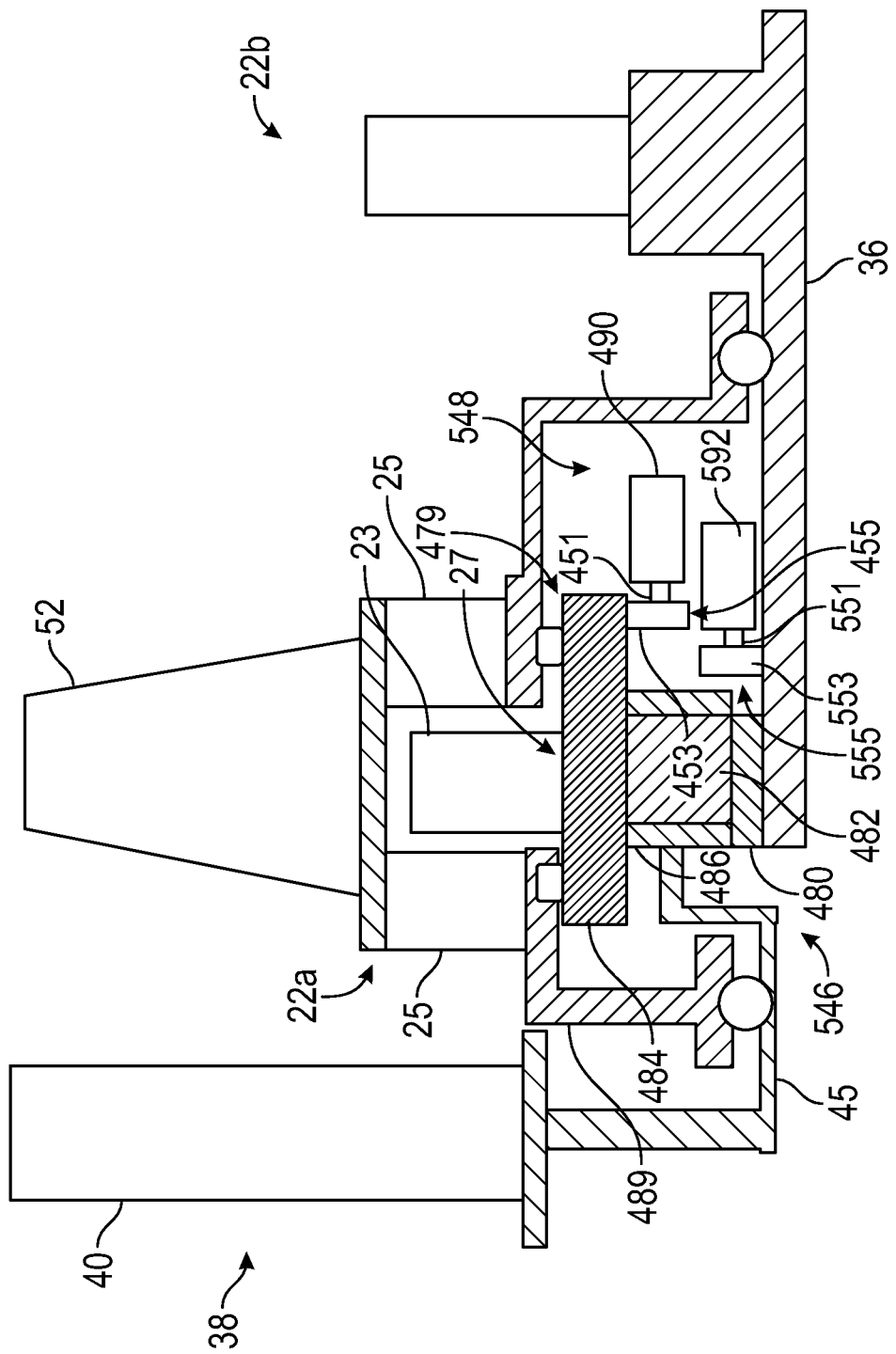
FIG. 5 is a schematic cross-sectional side view of a differential gearbox assembly for a turbine engine, taken along a longitudinal centerline o the turbine engine, according to an embodiment of the present disclosure.

FIG. 5 is a schematic side cross-sectional view of a differential gearbox assembly 546 for a turbine engine, taken along a longitudinal centerline of the turbine engine, according to an embodiment of the present disclosure. The differential gearbox assembly 546 includes many of the same components and the same functionality as the differential gearbox assembly 446. The differential gearbox assembly 546 includes an electric machine assembly 548 connected therewith. The electric machine assembly 548 includes the electric motor 490 and an electric generator 592. The electric machine assembly 548 includes substantially the same functionality as the electric machine assembly 448, detailed above. For example, the electric machine assembly 548 is a compact drive system. In the embodiment of FIG. 5, the electric generator 592 is a separate component from the electric motor 490. The electric generator 592 is coupled to the LP shaft 36. For example, the electric generator 592 includes an input 555. The input 555 includes a shaft 551 and a gear 553. The shaft 553 coupled to the gear 553 and the gear 553 is intermeshed with the LP shaft 36. In this way, the electric generator 592 generates electric power directly from the mechanical power of the LP shaft 36. For example, the torque from the LP shaft 36 is transferred directly to the electric generator 592 through the input 555.

Figure 6:
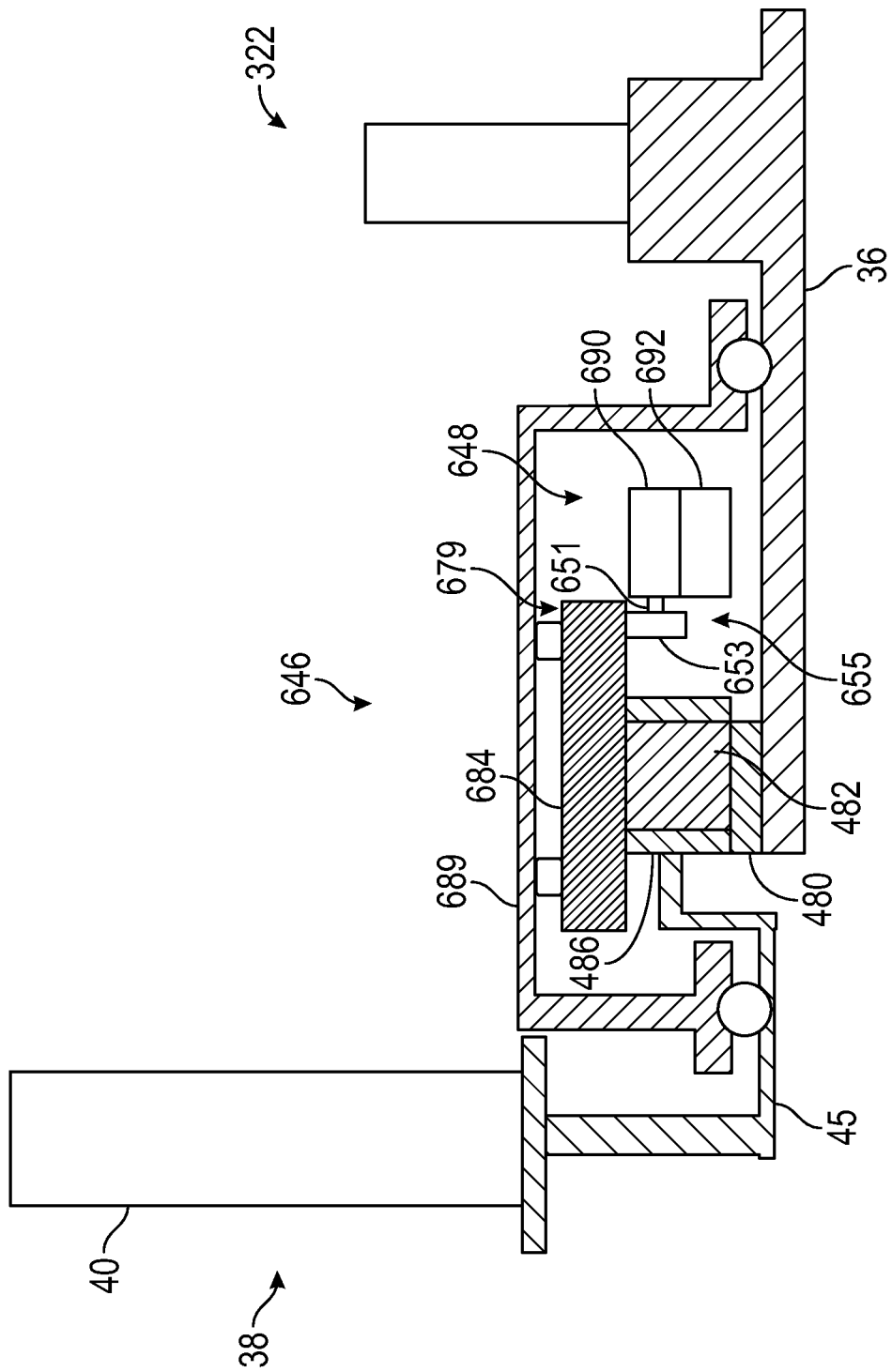
FIG. 6 is a schematic cross-sectional side view of a differential gearbox assembly for a turbine engine, taken along a longitudinal centerline o the turbine engine, according to an embodiment of the present disclosure.

FIG. 6 is a schematic cross-sectional side view of a differential gearbox assembly 646 for a turbine engine, taken along a longitudinal centerline of the turbine engine, according to an embodiment of the present disclosure. The differential gearbox assembly 646 may be employed in the turbine engine 310 of FIG. 3. In the embodiment of FIG. 6, the differential gearbox assembly 646 includes many of the same components and functionality of the differential gearbox assembly 446, detailed above. The differential gearbox assembly 646, however, is not coupled to a first booster stage 22a of the booster 22. In this way, a ring gear 484 of an epicyclic gear assembly 679 of the differential gearbox assembly 646 is coupled to an electric machine assembly 648, but is not coupled to the booster 322. A housing 689 may enclose the differential gearbox assembly 646. The electric machine assembly 648 includes an electric motor 690 and electric generator 692, similar to the embodiment of FIG. 4. For example, the electric machine assembly 648 is a compact drive system and includes a shaft 651 and a gear 653.

In operation, the LP shaft 36 rotates at high speed and provides torque or mechanical power to the sun gear 480 at the high speed. The sun gear 480 drives the planet carrier 486 (e.g., through the plurality of planet gears 482), and the planet carrier 486 drives the fan 38 at a different speed than the LP shaft 36. The planet carrier 486 is connected to the ring gear 684, and the ring gear 684 is connected to the electric machine assembly 648, as detailed above. Mechanical power of the LP shaft 36 is provided as an input to the differential gearbox assembly 646 via the sun gear 480. The mechanical power of the LP shaft 36 is provided to the fan 38 via the planet carrier 486. The mechanical power of LP shaft 36 is also provided to the electric machine assembly 648 via the ring gear 684. In this way, torque is transferred from the LP turbine 30 (FIGS. 1 to 3) to the sun gear 480 through the LP shaft 36. The torque is transferred from the sun gear 480 through the planet carrier 486 to the fan via the fan shaft 45. The torque is also transferred from the sun gear 480 through the ring gear 684 to the electric machine assembly 648.

In a first operating mode, the electric motor 690 of the electric machine assembly 648 drives the ring gear 684 to control a torque distribution for the fan 38 (e.g., the fan shaft 45). The electric motor 490 may provide electric power input through the ring gear 684 to generate more horsepower (e.g., mechanical power) at the fan 38, as detailed above. Thus, the electric motor 490 provides additional mechanical power to the fan 38 through the ring gear 684. In a second operating mode, the electric generator 492 of the electric machine assembly 648 generates and stores electric power, as detailed above. For example, mechanical power at the fan 38 is reduced and the mechanical power provided by the LP shaft 36 remains constant. The remaining mechanical power from the LP shaft 36 is provided to the electric generator 492 via the ring gear 684 to generate electric power, as detailed above.

Figure 7:
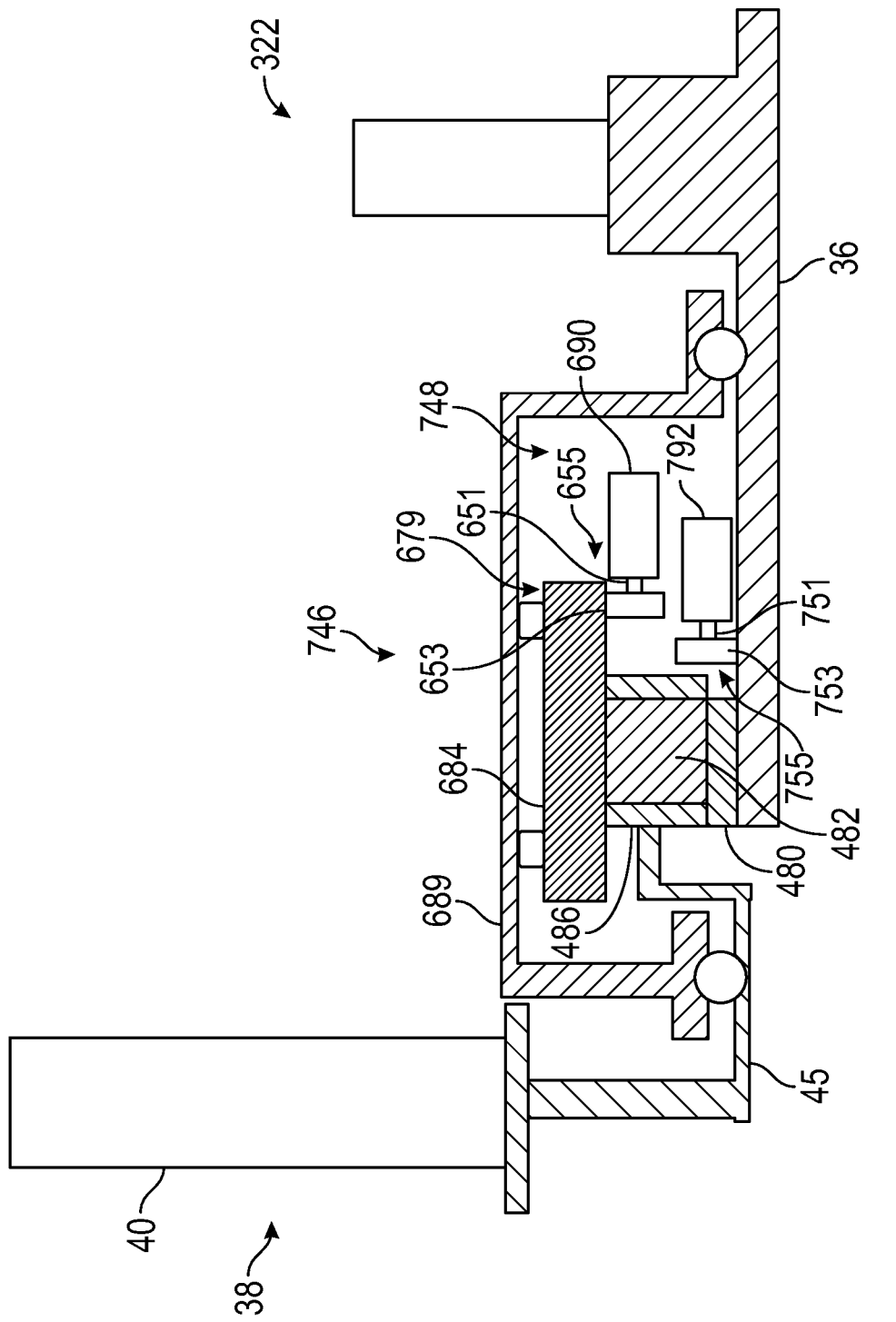
FIG. 7 is a schematic cross-sectional side view of a differential gearbox assembly for a turbine engine, taken along a longitudinal centerline o the turbine engine, according to an embodiment of the present disclosure.

FIG. 7 is a schematic cross-sectional side view of the differential gearbox assembly 746 for a turbine engine, taken along a longitudinal centerline of the turbine engine, according to an embodiment of the present disclosure. The differential gearbox assembly 746 includes many of the same components and the same functionality as the differential gearbox assembly 646. The differential gearbox assembly 746 includes an electric machine assembly 748 connected therewith. The electric machine assembly 748 includes the electric motor 690 and an electric generator 792. The electric machine assembly 748 includes substantially the same functionality as the electric machine assembly 648, detailed above. In the embodiment of FIG. 7, however, the electric generator 792 is a separate component from the electric motor 690. The electric generator 792 is coupled to the LP shaft 36. For example, the electric generator 792 includes an input 755. The input 755 includes a shaft 751 and a gear 753. The shaft 751 is coupled to the gear 753 and the gear 753 intermeshes with the LP shaft 36. In this way, the electric generator 792 generates electric power directly from the mechanical power of the LP shaft 36.

Figure 8:
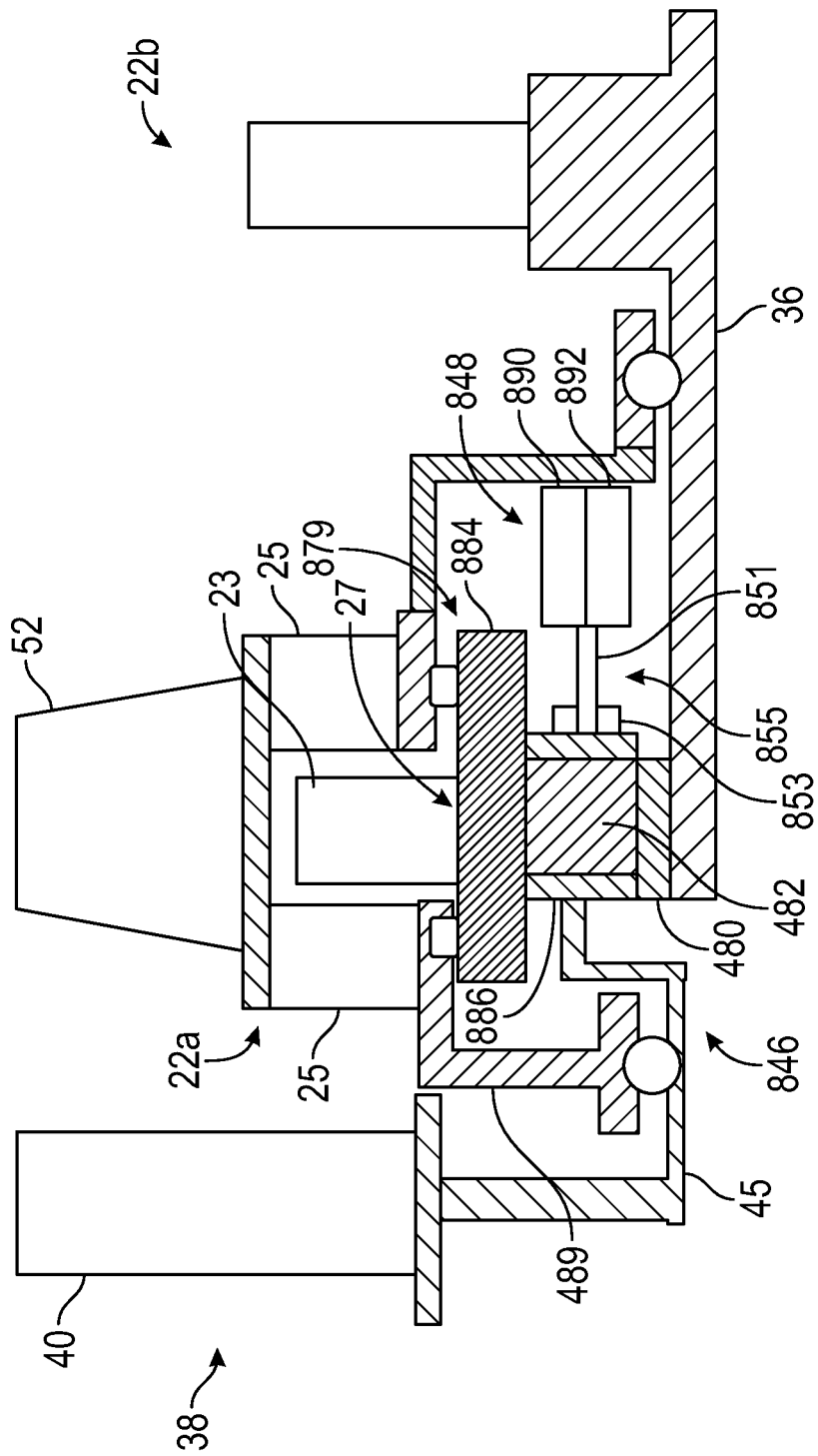
FIG. 8 is a schematic cross-sectional side view of a differential gearbox assembly for a turbine engine, taken along a longitudinal centerline o the turbine engine, according to an embodiment of the present disclosure.

FIG. 8 is a schematic side cross-sectional view of a differential gearbox assembly 846 for a turbine engine, taken along a longitudinal centerline of the turbine engine, according to an embodiment of the present disclosure. The differential gearbox assembly 846 may be employed in the turbine engine 10 of FIG. 1 or in the turbine engine 210 of FIG. 2. In the embodiment of FIG. 8, the differential gearbox assembly 846 includes many of the same components and functionality of the differential gearbox assembly 446. For example, the differential gearbox 846 includes an epicyclic gear assembly 879. In FIG. 8, an electric machine assembly 848 is coupled to a planet carrier 886. In this way, an input 855 of the electric machine assembly 848 is coupled to the planet carrier 886. The input 855 includes a shaft 851 and a gear 853, similar to the embodiment of FIG. 4. The gear 853, however, is intermeshed with the planet carrier 886. Thus, the electric machine assembly 848 is not connected to a ring gear 884 in the embodiment of FIG. 8.

In operation, mechanical power of the LP shaft 36 is provided as an input to the differential gearbox assembly 846 via the sun gear 480, as detailed above. The mechanical power of the LP shaft 36 is provided to the fan 38 and to the electric machine assembly 848 via the planet carrier 886. The mechanical power of LP shaft 36 is also provided to the first booster stage 22a via the ring gear 884. The mechanical power or the torque split between the first booster stage 22a and the electric machine assembly 848 is varied at the first booster stage 22*a* by modulating the VSVs 25, as detailed above.

In a first operating mode, an electric motor 890 of the electric machine assembly 848 drives the planet carrier 886 to control a torque distribution for the first booster stage 22*a* (and the second fan 238*b* of FIG. 2) and the fan 38 (e.g., the fan shaft 45) via the ring gear 884. The electric motor 890 may provide electric power input through the planet carrier 886 to generate more horsepower (e.g., mechanical power) at the fan 38 through a torque increase at the first booster stage 22*a*. For example, the electric motor 890 changes the torque of the planet carrier 886, and, thus, to the ring gear 884, while the VSVs 25 are actuated to control the incidence angle to ensure the speed of the ring gear 884 remains constant.

In a second operating mode, the electric generator 892 of the electric machine assembly 848 generates electric power. For example, the fan 38 may reduce mechanical power, while the mechanical power provided by the LP shaft 36 remains constant. The mechanical power of the LP shaft 36 that is no longer going to the fan 38 (e.g., due to the reduced mechanical power of the fan 38) is provided to the electric generator 892 through the planet carrier 886. In this way, the electric generator 892 of the electric machine assembly 848 generates and stores electric power, as detailed above.

Figure 9:
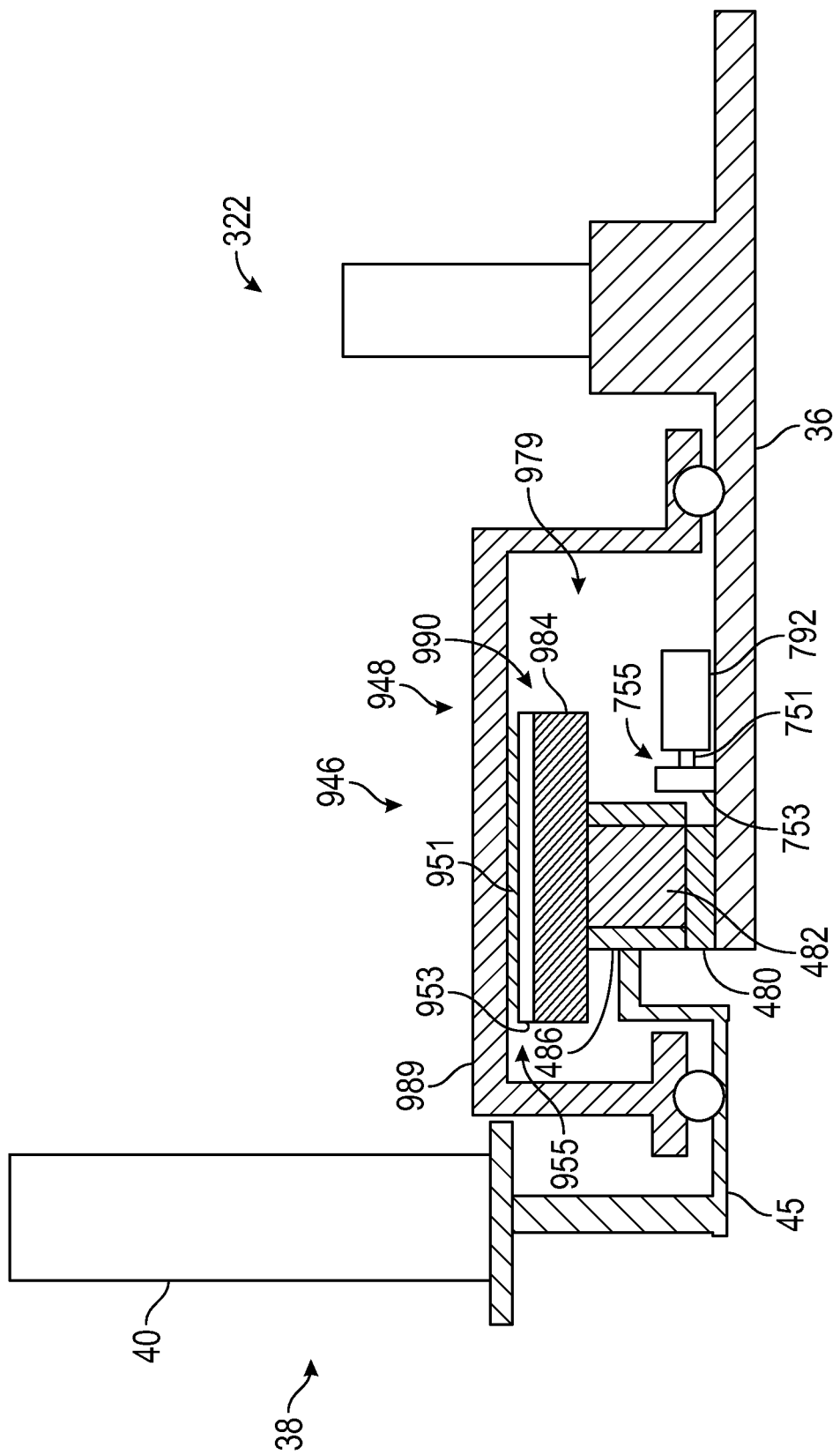
FIG. 9 is a schematic cross-sectional side view of a differential gearbox assembly for a turbine engine, taken along a longitudinal centerline o the turbine engine, according to an embodiment of the present disclosure.

FIG. 9 is a schematic side cross-sectional view of a differential gearbox assembly 946 for a turbine engine, taken along a longitudinal centerline of the turbine engine, according to an embodiment of the present disclosure. The differential gearbox assembly 946 may be employed in the turbine engine 10 of FIG. 1, in the turbine engine 210 of FIG. 2, or in the turbine engine 310 of FIG. 3. In the embodiment of FIG. 9, the differential gearbox assembly 946 includes many of the same components and functionality of the differential gearbox assembly 746. For example, the differential gearbox assembly 946 includes an epicyclic gear assembly 979.

In the embodiment of FIG. 9, the differential gearbox assembly 946 is coupled to an electric machine assembly 948. The electric machine assembly 948 includes an electric motor 990 and the electric generator 792. The electric generator 792 is a separate component from the electric motor 990. The electric generator 792 is a compact drive system and is coupled to the LP shaft 36. In this way, the electric generator 792 generates electric power directly from the mechanical power of the LP shaft 36. The electric motor 990 is an annular drive system. Thus, the electric motor 990 includes an input 955 that includes a stator 951 and a rotor 953 that are annular about the LP shaft 36. The electric motor 990 is considered a reverse motor in that the stator 951 is coupled to a static component of the differential gearbox assembly 946. For example, the stator 951 may be coupled to a housing 989. The stator 951 may include a plurality of windings that receive electric power from a power source (e.g., the electric generator 792). The plurality of windings of the stator 951 may be mounted to the housing 989. The rotor 953 includes one or more permanent magnets on a ring gear 984. For example, the rotor 753 may be integral with the ring gear 984. In this way, the electric motor 990 is a permanent magnet motor. Thus, the rotor 953 is rotatable with the ring gear 984. The stator 951 imparts an electromagnetic force that causes the rotor 953 to rotate, thus, causing the ring gear 984 to rotate. In this way, mechanical power or torque is transferred between the electric machine assembly 948 and the ring gear 984, as detailed above.

Figure 10:
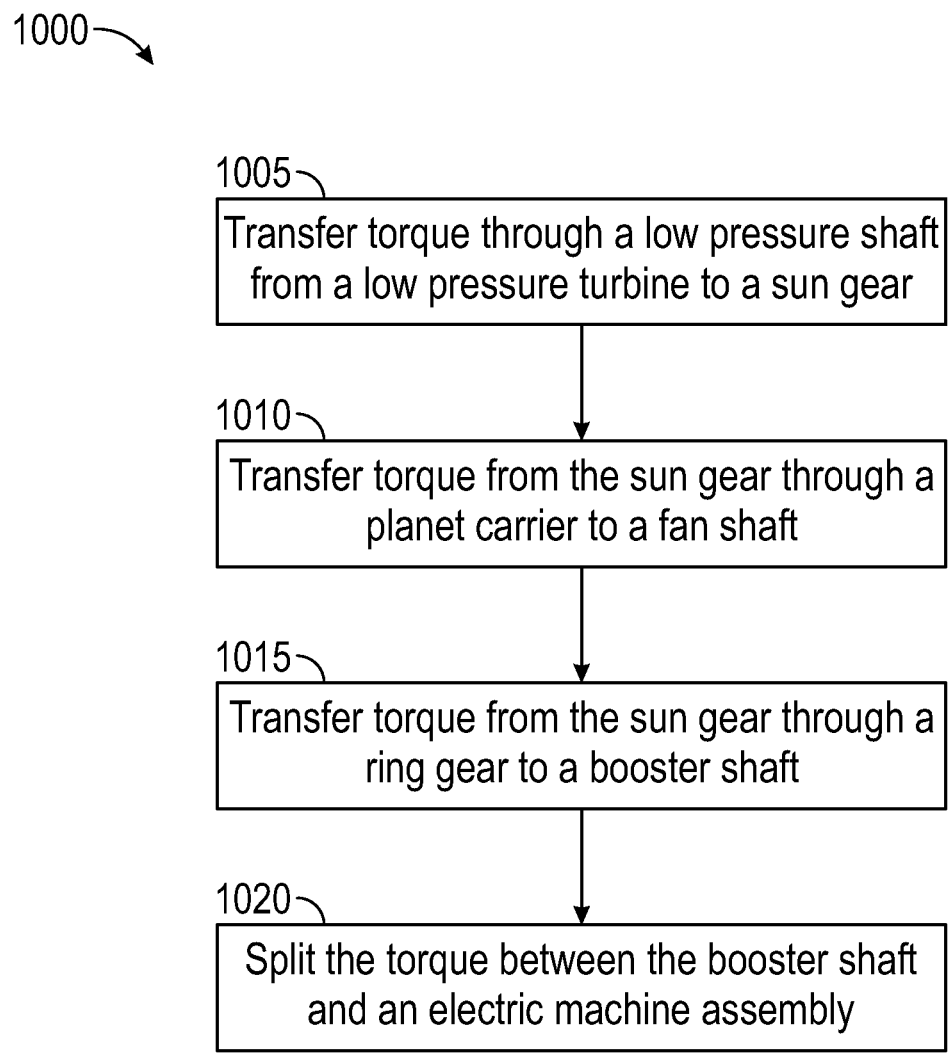
FIG. 10 is a flow diagram of an exemplary method of operating a differential gearbox assembly of a turbine engine, according to an embodiment of the present disclosure.

FIG. 10 is a flow diagram of an exemplary method 1000 of operating a differential gearbox assembly of a turbine engine, according to an embodiment of the present disclosure. While the method 1000 is described with reference to the differential gearbox assembly 446 of the turbine engine 10, the method 1000, of course, may be performed by any of the differential gearbox assemblies and turbine engines described herein.

In step 1005, the method 1000 includes transferring torque through the LP shaft 36 from the LP turbine 30 to the sun gear 480. The LP turbine 30 is driven with the combustion gases 66, as detailed above. For example, the LP shaft 36 rotates and provides torque and mechanical power to the sun gear 480.

In step 1010, the method 1000 includes transferring the torque from the sun gear 480 through the planet carrier 486 to the fan shaft 45. For example, the planet carrier 486 is driven by the sun gear 480 such that the fan shaft 45 rotates, as detailed above. In this way, the fan shaft 45 rotates the fan 38.

In step 1015, the method 1000 includes transferring the torque from the sun gear 480 through the ring gear 484 to the booster shaft 27. In this way, the booster shaft 27 rotates the booster 22. For example, the booster shaft 27 rotates the first booster stage 22*a*.

In step 1020, the method 1000 includes splitting the torque between the booster shaft 27 and the electric machine assembly 448. Such an arrangement allows the booster shaft 27, the fan shaft 45, and the LP shaft 36 to rotate at different speeds.

In some examples, the electric machine assembly 448 drives the ring gear 484 to control a distribution of the torque between the booster shaft 27 and the fan shaft 45. In some examples, the electric machine assembly 448 drives the planet carrier 486 to control the distribution of the torque between the booster shaft 27 and the fan shaft 45. The electric machine assembly 448 provides an electric power input to the differential gearbox assembly in a first operating mode of the turbine engine, as detailed above. The electric machine assembly 448 generates electric power at the electric machine assembly in a second operating mode of the turbine engine, as detailed above. In some examples, the torque to the booster shaft 27 is reduced and the torque to the electric machine assembly 448 is increased. The torque to the booster shaft 27 is reduced by actuating the plurality of VSVs 25, as detailed above.

The embodiments of the present disclosure detailed herein provide for higher rotational speeds of the LP turbine, the fan, and the high-pressure turbine as compared to turbine engines without the benefit of the present disclosure. Embodiments of the present disclosure may differentiate the speeds at transient conditions (e.g., during various mission cycles of the turbine engine). The equal distribution of torque on the rotating components (e.g., the fan, the LP turbine, or the booster) eliminates or reduces bearing dynamic issues and shaft dynamic issues compared to turbine engines without the benefit of the present disclosure.

Further aspects of the present disclosure are provided by the subject matter of the following clauses.

A differential gearbox assembly for a turbine engine that includes a fan shaft and a drive shaft. The differential gearbox assembly includes an epicyclic gear assembly coupling the fan shaft to the drive shaft. The epicyclic gear assembly includes a sun gear, a planet gear constrained by a planet carrier, and a ring gear. The sun gear is coupled to the drive shaft and the planet carrier is coupled to the fan shaft. The sun gear, the planet gear, and the ring gear all rotate about the drive shaft. The differential gearbox assembly includes an electric machine assembly that includes an input coupled to the epicyclic gear assembly. The electric machine assembly provides mechanical power to the fan shaft through the epicyclic gear assembly.

The differential gearbox assembly of the preceding clause, the turbine engine including a booster shaft, and the ring gear being coupled to the booster shaft. The differential gearbox assembly splits a torque between the booster shaft and the electric machine assembly.

The differential gearbox assembly of any preceding clause, the differential gearbox assembly transferring a torque from the LP shaft to the electric machine assembly.

The differential gearbox assembly of any preceding clause, the differential gearbox transferring the torque from the LP shaft to the fan shaft through the planet carrier.

The differential gearbox assembly of any preceding clause, the input of the electric machine assembly being coupled to the planet carrier, and the electric machine assembly drives the planet carrier to provide mechanical power to the fan shaft.

The differential gearbox assembly of any preceding clause, the electric machine assembly generating electric power from the differential gearbox assembly.

The differential gearbox assembly of any preceding clause, the electric machine assembly being an annular drive system such that the electric machine assembly is annular about the drive shaft The differential gearbox assembly of any preceding clause, the electric machine assembly including a stator and a rotor that are annular rings.

The differential gearbox assembly of any preceding clause, the stator and the rotor being annular about the drive shaft.

The differential gearbox assembly of any preceding clause, the electric machine assembly being a compact drive system.

The differential gearbox assembly of any preceding clause, the compact drive system including a stator and a rotor disposed within a housing of the electric machine assembly.

The differential gearbox assembly of any preceding clause, the electric machine assembly including an electric generator that generates electric power from the epicyclic gear assembly when mechanical power of the fan shaft is reduced.

The differential gearbox assembly of any preceding clause, the electric machine assembly including an electric motor that provides mechanical power to the fan shaft through the differential gearbox assembly in a first operating mode of the turbine engine. The electric generator generates the electric power in a second operating mode of the turbine engine.

The differential gearbox assembly of any preceding clause, the electric machine assembly including an electric motor for driving at least one gear of the differential gearbox assembly and an electric generator for generating electric power.

The differential gearbox assembly of any preceding clause, the input of the electric machine assembly being coupled to the ring gear. The electric machine assembly drives the ring gear to provide mechanical power to the fan shaft.

The differential gearbox assembly of any preceding clause, the electric machine assembly including a stator and a rotor that includes one or more permanent magnets on the ring gear. The stator connects to a static component of the differential gearbox assembly.

The differential gearbox assembly of any preceding clause, the electric motor being coupled to the ring gear.

The differential gearbox assembly of any preceding clause, the electric generator being coupled to the drive shaft.

The differential gearbox assembly of any preceding clause, the electric machine assembly being coupled to the planet carrier. The electric machine assembly drives the planet carrier to provide mechanical power to the fan shaft.

The differential gearbox assembly of any preceding clause, a torque on the ring gear being split between the booster shaft and the electric machine assembly.

The differential gearbox assembly of any preceding clause, a torque draw of the electric machine assembly being increased when a torque draw of a booster of the turbine engine is reduced.

The differential gearbox assembly of any preceding clause, the booster including a plurality of variable stator vanes movable about a pitch axis to change an incidence angle of the plurality of variable stator vanes.

The differential gearbox assembly of any preceding clause, the plurality of variable stator vanes being actuated to change the torque draw of the booster.

The differential gearbox assembly of any preceding clause, a booster of the turbine engine including a first booster stage connected to the ring gear and a second booster stage connected to the drive shaft.

The differential gearbox assembly of any preceding clause, the booster shaft, the drive shaft, and the fan shaft rotating at different speeds through the differential gearbox assembly.

The differential gearbox assembly of any preceding clause, the fan shaft including a first fan shaft and a second fan shaft. The first fan shaft connects to the planet carrier and the second fan shaft connects to the ring gear.

The differential gearbox assembly of any preceding clause, the drive shaft being a low pressure (LP) shaft.

A turbine engine including a turbine, a fan, and a differential gearbox assembly. The turbine includes a drive shaft. The fan includes a fan shaft. The differential gearbox assembly includes an epicyclic gear assembly coupling the fan shaft to the drive shaft. The epicyclic gear assembly includes a sun gear, a planet gear constrained by a planet carrier, and a ring gear. The sun gear, the planet gear, and the ring gear all rotate about the drive shaft. The differential gearbox assembly includes and an electric machine assembly. The electric machine assembly includes an input coupled to the epicyclic gear assembly. The electric machine assembly provides mechanical power to the fan through the epicyclic gear assembly.

The turbine engine of the preceding clause, further including a booster. The booster includes a booster shaft. The ring gear is coupled to the booster shaft. The differential gearbox assembly splits a torque between the booster shaft and the electric machine assembly.

The turbine engine of any preceding clause, the differential gearbox assembly transferring a torque from the drive shaft to the electric machine assembly.

The turbine engine of any preceding clause, the differential gearbox assembly transferring the torque from the drive shaft to the fan shaft through the planet carrier.

The turbine engine of any preceding clause, the input of the electric machine assembly being coupled to the planet carrier, and the electric machine assembly drives the planet carrier to provide mechanical power to the fan shaft.

The turbine engine of any preceding clause, the electric machine assembly generating electric power from the differential gearbox assembly.

The turbine engine of any preceding clause, the electric machine assembly being an annular drive system such that the electric machine assembly is annular about the drive shaft.

The turbine engine of any preceding clause, the electric machine assembly including a stator and a rotor that are annular rings.

The turbine engine of any preceding clause, the stator and the rotor being annular about the drive shaft.

The turbine engine of any preceding clause, the electric machine assembly being a compact drive system.

The turbine engine of any preceding clause, the compact drive system including a stator and a rotor disposed within a housing of the electric machine assembly.

The turbine engine of any preceding clause, the electric machine assembly including an electric generator that generates electric power from the epicyclic gear assembly when power of the fan shaft is reduced.

The turbine engine of any preceding clause, the electric machine assembly including an electric motor that provides mechanical power to the fan shaft through the differential gearbox assembly in a first operating mode of the turbine engine. The electric machine assembly generates the electric power in a second operating mode of the turbine engine.

The turbine engine of any preceding clause, the electric machine assembly including an electric motor for driving at least one gear of the differential gearbox assembly and an electric generator for generating electric power.

The turbine engine of any preceding clause, the electric machine assembly being coupled to the ring gear. The electric machine assembly drives the ring gear to provide mechanical power to the fan shaft.

The turbine engine of any preceding clause, the electric machine assembly including a stator and a rotor that includes one or more permanent magnets on the ring gear. The stator couples to a static component of the differential gearbox assembly.

The turbine engine of any preceding clause, the electric motor being coupled to the ring gear.

The turbine engine of any preceding clause, the electric motor being coupled to the ring gear.

The turbine engine of any preceding clause, the electric generator being coupled to the drive shaft.

The turbine engine of any preceding clause, the electric machine assembly being coupled to the planet carrier. The electric machine assembly drives the planet carrier to provide mechanical power to the fan.

The turbine engine of any preceding clause, a torque on the ring gear being split between the booster shaft and the electric machine assembly.

The turbine engine of any preceding clause, a torque draw of the electric machine assembly being increased when a torque draw of the booster is reduced.

The turbine engine of any preceding clause, the booster including a plurality of variable stator vanes movable about a pitch axis to change an incidence angle of the plurality of variable stator vanes.

The turbine engine of any preceding clause, the plurality of variable stator vanes being actuated to change a torque draw of the booster.

The turbine engine of any preceding clause, the booster including a first booster stage coupled to the ring gear and a second booster stage connected to the drive shaft.

The turbine engine of any preceding clause, the booster shaft, the drive shaft, and the fan shaft rotating at different speeds through the differential gearbox assembly.

The turbine engine of any preceding clause, the fan including a first fan having a first fan shaft and a second fan having a second fan shaft. The first fan shaft couples to the planet carrier and the second fan shaft couples to the ring gear.

The turbine engine of any preceding clause, the drive shaft being a low pressure (LP) shaft.

A method of operating a differential gearbox assembly for a turbine engine including a fan having a fan shaft, a turbine having a drive shaft, and a booster having a booster shaft. The method includes transferring torque through the drive shaft from the turbine to a sun gear of the differential gearbox assembly, transferring the torque from the sun gear through a planet carrier of the differential gearbox assembly to the fan shaft. The fan shaft is connected to and rotates the fan. The method includes transferring the torque from the sun gear through a ring gear of the differential gearbox assembly to the booster shaft. The method includes splitting the torque between the booster shaft and an electric machine assembly.

The method of the preceding clause, the booster shaft, the fan shaft, and the drive shaft rotating at different speeds.

The method of any preceding clause, further including driving the ring gear with the electric machine assembly to control a distribution of the torque between the booster shaft and the fan shaft.

The method of any preceding clause, further including driving the planet carrier with the electric machine assembly to control a distribution of the torque between the booster shaft and the fan shaft.

The method of any preceding clause, further including providing mechanical power from the electric machine assembly to the differential gearbox assembly in a first operating mode of the turbine engine.

The method of any preceding clause, further including generating electric power at the electric machine assembly in a second operating mode of the turbine engine.

The method of any preceding clause, further including providing mechanical power from the electric machine assembly to the fan shaft through the differential gearbox assembly.

The method of any preceding clause, further including generating electric power by the electric machine assembly when mechanical power to the fan is reduced.

The method of any preceding clause, further including reducing the torque to the booster shaft and increasing the torque to the electric machine assembly.

The method of any preceding clause, the reducing the torque to the booster shaft including actuating a plurality of variable stator vanes to reduce the torque to the booster shaft.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A differential gearbox assembly for a turbine engine having a fan shaft, a drive shaft, and a booster having a plurality of variable stator vanes and a plurality of blades coupled to a booster shaft, the differential gearbox assembly comprising:

an epicyclic gear assembly coupling the fan shaft to the drive shaft and coupling the booster shaft to the drive shaft through the epicyclic gear assembly, the epicyclic gear assembly including a sun gear, a planet gear constrained by a planet carrier, and a ring gear, the sun gear coupled to the drive shaft, the planet carrier coupled to the fan shaft, and the ring gear coupled to the booster shaft, wherein the sun gear, the planet gear, and the ring gear all rotate about the drive shaft, and the drive shaft provides mechanical power to the fan shaft and to the booster shaft through the epicyclic gear assembly; and an electric machine assembly comprising an input coupled to the epicyclic gear assembly, the electric machine assembly providing mechanical power to the fan shaft through the epicyclic gear assembly, wherein the electric machine assembly includes an electric motor and an electric generator for generating electric power, the electric motor providing additional mechanical power to the fan shaft during operation of the turbine engine, and at least a portion of the mechanical power from the drive shaft is provided to the electric generator when mechanical power to the fan shaft is reduced such that the electric generator generates electric power from the epicyclic gear assembly, and the plurality of variable stator vanes are actuated to change an incidence angle of the plurality of variable stator vanes to change an air flow to the plurality of blades of the booster such that a speed of the ring gear remains constant while the electric motor provides the additional mechanical power to the fan shaft.

2. The differential gearbox assembly of claim 1, wherein the differential gearbox assembly splits a torque between the booster shaft and the electric machine assembly.

3. The differential gearbox assembly of claim 1, wherein the electric motor drives at least one gear of the epicyclic gear assembly.

4. The differential gearbox assembly of claim 1, wherein the input of the electric machine assembly is coupled to the planet carrier, and the electric machine assembly drives the planet carrier to provide mechanical power to the fan shaft.

5. The differential gearbox assembly of claim 1, wherein the electric machine assembly is an annular drive system such that the electric machine assembly is annular about the drive shaft.

6. The differential gearbox assembly of claim 1, wherein the electric machine assembly is a compact drive system.

7. The differential gearbox assembly of claim 1, wherein the electric motor provides mechanical power to the fan shaft through the differential gearbox assembly in a first operating mode of the turbine engine, and the electric generator generates the electric power in a second operating mode of the turbine engine.

8. The differential gearbox assembly of claim 7, wherein the first operating mode and the second operating mode include at least one of a takeoff flight mode, a climb flight mode, a cruise flight mode, a step change flight mode, a descent flight mode, a landing flight mode, or a taxi flight mode, and the second operating mode is different than the first operating mode.

9. The differential gearbox assembly of claim 1, wherein the input of the electric machine assembly is coupled to the ring gear, and the electric machine assembly drives the ring gear to provide mechanical power to the fan shaft.

10. The differential gearbox assembly of claim 9, wherein the electric machine assembly comprises:
a stator connected to a static component of the differential gearbox assembly; and
a rotor that includes one or more permanent magnets on the ring gear.

11. The differential gearbox assembly of claim 1, wherein the plurality of variable stator vanes are actuated to change the incidence angle of the plurality of variable stator vanes to reduce mechanical power to the booster shaft such that the electric generator generates electric power from the epicyclic gear assembly.

12. A turbine engine comprising:
a turbine including a drive shaft;
a fan including a fan shaft;
a booster including a booster shaft, a plurality of variable stator vanes, and a plurality of blades coupled to the booster shaft; and
a differential gearbox assembly comprising:
an epicyclic gear assembly coupling the fan shaft to the drive shaft and coupling the booster shaft to the drive shaft through the epicyclic gear assembly, the epicyclic gear assembly including a sun gear, a planet gear constrained by a planet carrier, and a ring gear, the sun gear coupled to the drive shaft and the planet carrier coupled to the fan shaft, and the ring gear coupled to the booster shaft, wherein the sun gear, the planet gear, and the ring gear all rotate about the drive shaft, and the drive shaft provides mechanical power to the fan shaft and to the booster shaft through the epicyclic gear assembly; and
an electric machine assembly comprising an input coupled to the epicyclic gear assembly, the electric machine assembly providing mechanical power to the fan through the epicyclic gear assembly, wherein the electric machine assembly includes an electric motor and an electric generator for generating electric power, the electric motor providing additional mechanical power to the fan shaft during operation of the turbine engine, and at least a portion of the mechanical power from the drive shaft is provided to the electric generator when mechanical power to the fan shaft is reduced such that the electric generator generates electric power from the epicyclic gear assembly, and the plurality of variable stator vanes are actuated to change an incidence angle of the plurality of variable stator vanes to change an air flow to the plurality of blades of the booster such that a speed of the ring gear remains constant while the electric motor provides the additional mechanical power to the fan shaft.

13. The turbine engine of claim 12, wherein the differential gearbox assembly splits a torque between the booster shaft and the electric machine assembly.

14. The turbine engine of claim 12, wherein the electric motor drives at least one gear of the epicyclic gear assembly.

15. The turbine engine of claim 12, wherein the input of the electric machine assembly is coupled to the planet carrier, and the electric machine assembly drives the planet carrier to provide mechanical power to the fan shaft.

16. The turbine engine of claim 12, wherein the electric machine assembly is an annular drive system such that the electric machine assembly is annular about the drive shaft.

17. The turbine engine of claim 12, wherein the electric machine assembly is a compact drive system.

18. The turbine engine of claim 12, wherein the electric motor provides mechanical power to the fan shaft through the differential gearbox assembly in a first operating mode of the turbine engine, and the electric generator generates the electric power in a second operating mode of the turbine engine.

19. The turbine engine of claim 12, wherein the input of the electric machine assembly is coupled to the ring gear, and the electric machine assembly drives the ring gear to provide mechanical power to the fan shaft.

20. The turbine engine of claim 19, wherein the electric machine assembly comprises a stator connected to a static component of the differential gearbox assembly and a rotor that includes one or more permanent magnets on the ring gear.

* * * * *